E. L. DORSEY.
Tire Measure.
No. 19,550.
Patented March 9, 1858.
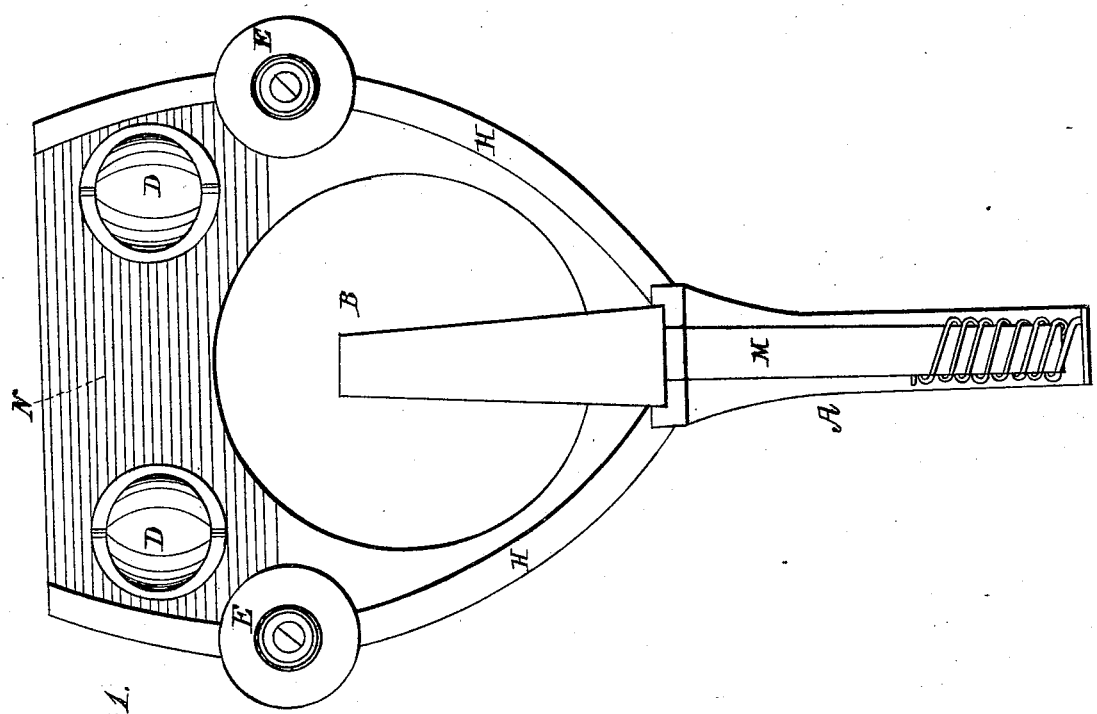

UNITED STATES PATENT OFFICE.

EDWD. L. DORSEY, OF JOHNSON COUNTY, INDIANA.

MACHINE FOR FITTING WAGON-TIRES.

Specification of Letters Patent No. 19,550, dated March 9, 1858.

*To all whom it may concern:*

Be it known that I, EDWARD L. DORSEY, of the county of Johnson and State of Indiana, have invented a new and Improved Mode of Running the Rim and Tire of Wagon-Wheels so They Will Fit When Put Together; and I do hereby declare that the following is a full and exact description thereof, reference being had to the accompanying drawings and the letters of reference marked thereon.

The nature of my invention consists in providing four small wheels, in addition to the main wheel, also a spring slide which governs the main wheel, and a hand attached to the main wheel, which marks the starting point.

To enable others skilled in the art to make and use my invention, I will proceed to describe its construction and operation.

I construct my machine with a hollow handle A, as shown in the drawing, in which works a spring slide, and to which are attached the arms H, H, as shown in the drawing. The spring slide marked M on the drawing governs and applies the main wheel B, to the rim or tire, and must be lengthened by the use of temper screw C, after running the outside rim or circle, so as to run the inside circle of the tire. The small wheels D, D, are attached to the head piece N, N of the arms, on horizontal axes and guide the main wheel on a direct line. The small wheels E, E, are also attached to the arms, on perpendicular axes as shown in the drawings, and are to guide the wheels D, D, on the edge of the tire in running the inside circle. The hand F, permanently attached to the axis of the wheel B, is to mark the starting point, as seen. The arms are to support the four small wheels which guide the main wheel.

Having thus fully described my invention I do not claim the wheel B, or the measuring of the tire by means of this wheel, but

What I do claim as new and desire to secure by Letters Patent is—

The arrangement herein described of the wheels E, E, and D, D, with the wheel B, hand F, and spring slide M, substantially in the manner and for the purpose herein fully set forth.

EDWARD L. DORSEY.

Witnesses:
  ISAAC BUMGARDNER,
  JOHN C. WEBB.